Feb. 19, 1946. F. E. KURZ 2,395,225
FILTER CONSTRUCTION
Filed July 9, 1942 4 Sheets-Sheet 1
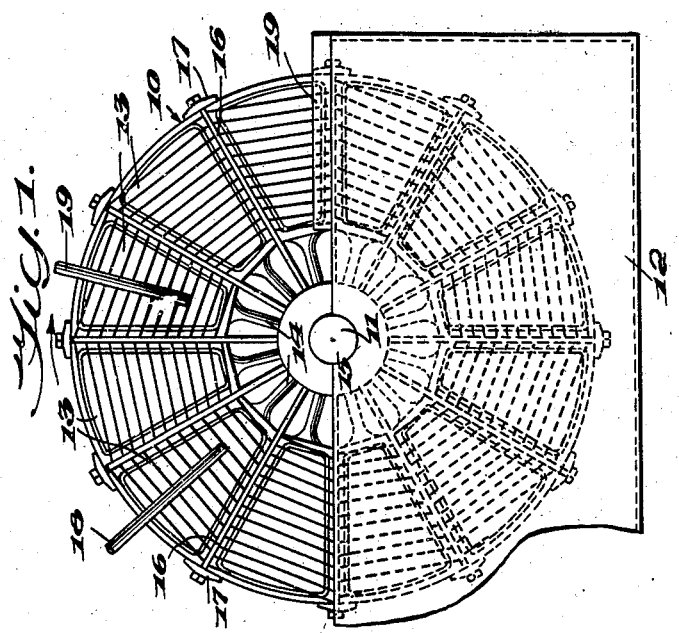
Inventor
Frederick E. Kurz,
By Pierce & Scheffler
Attorneys

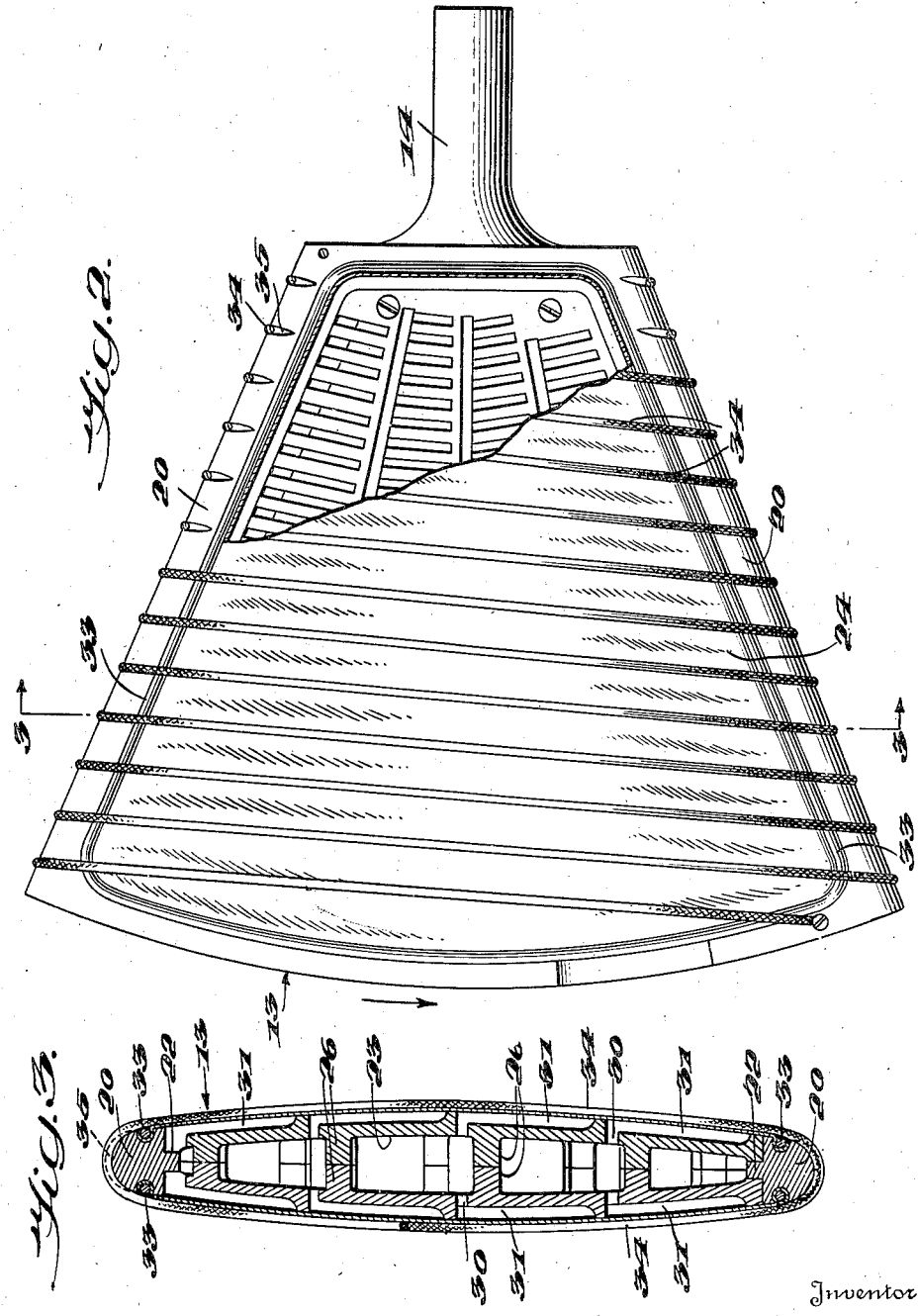

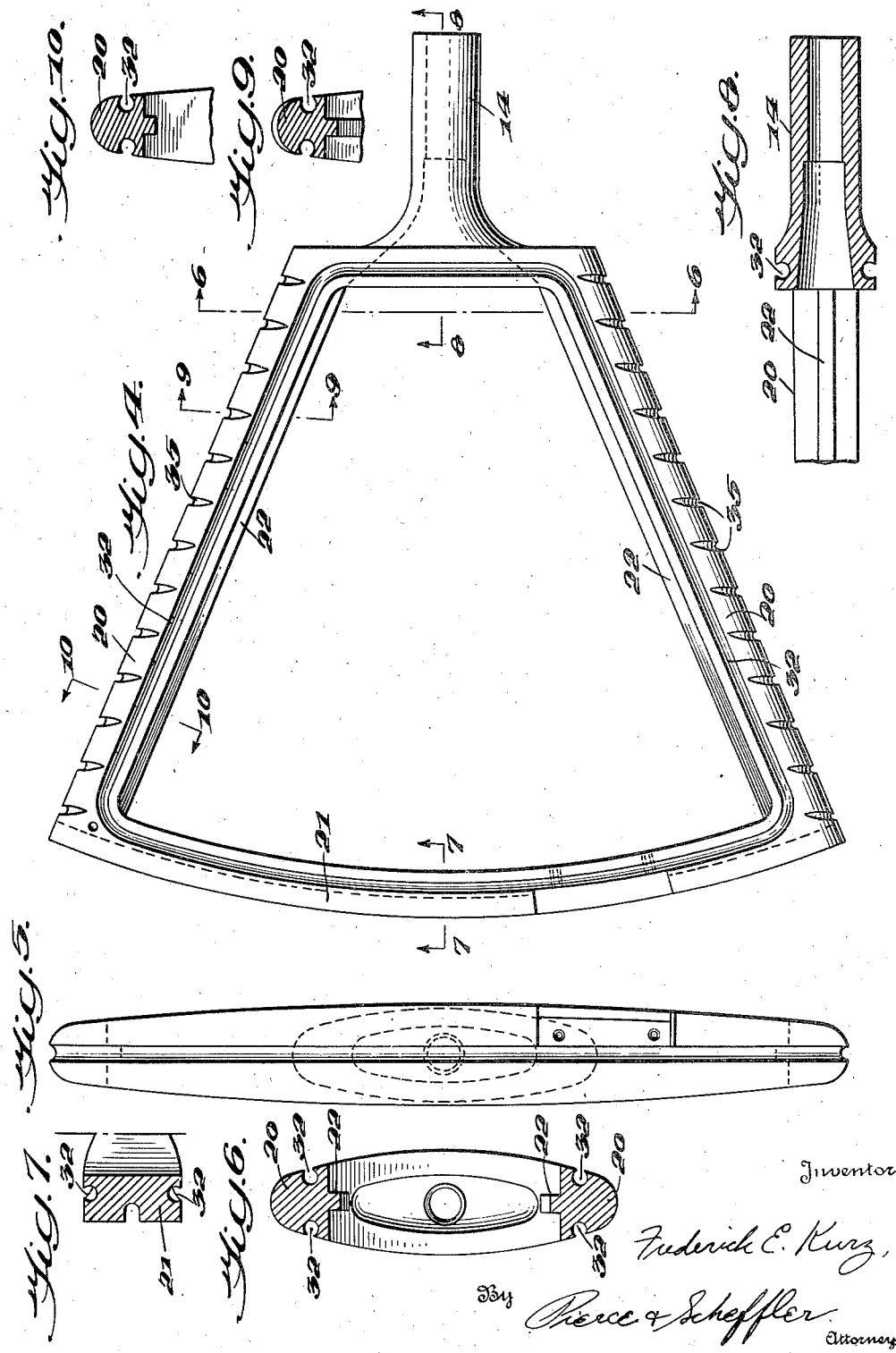

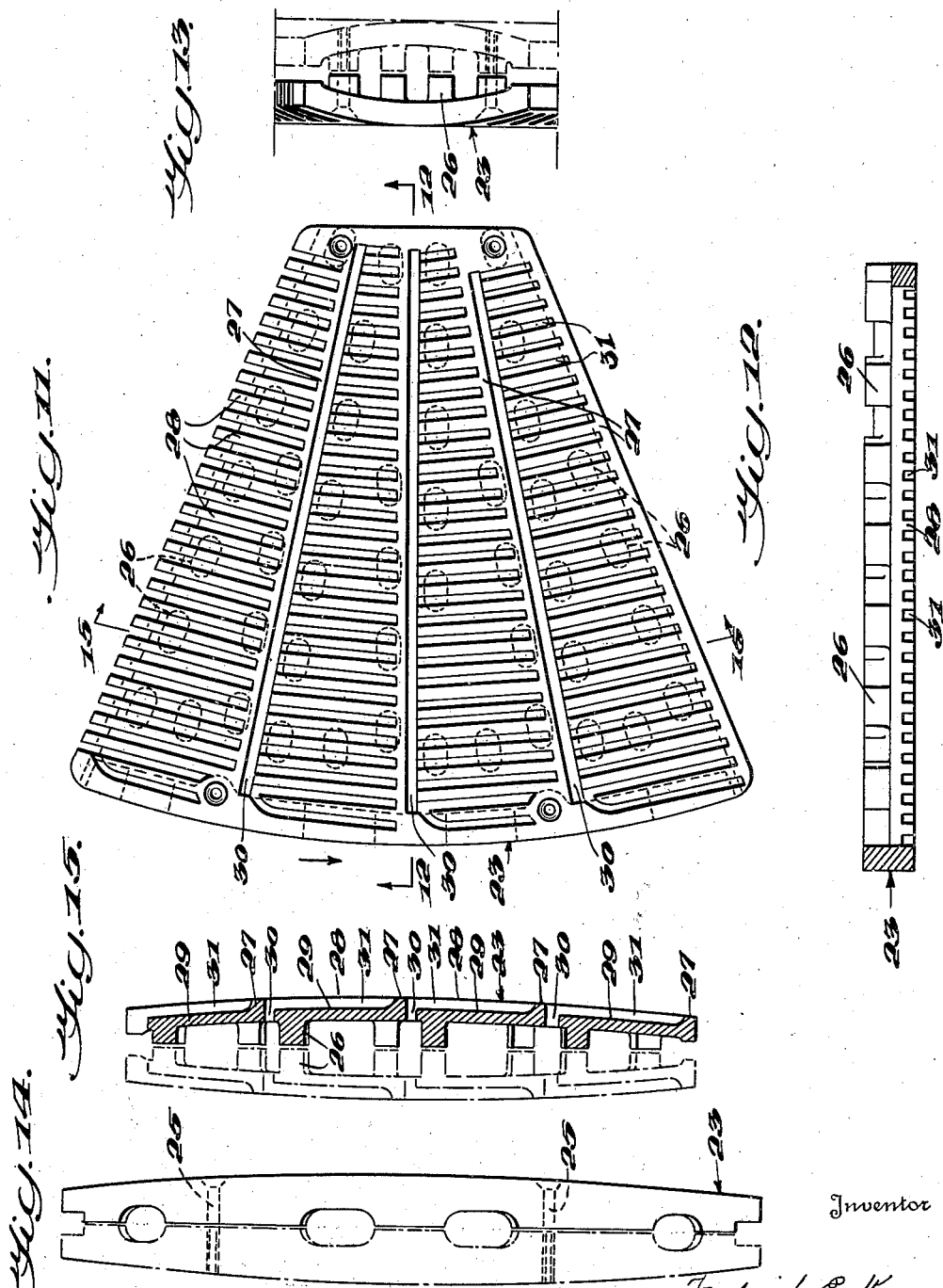

Patented Feb. 19, 1946

2,395,225

UNITED STATES PATENT OFFICE 2,395,225

FILTER CONSTRUCTION

Frederick E. Kurz, Glen Ellyn, Ill., assignor to The Eimco Corporation, Salt Lake City, Utah, a corporation of Utah Application July 9, 1942, Serial No. 450,315

7 Claims. (Cl. 210—200)

This invention relates to improvements in rotary filters.

In the filtering of certain materials, for example in the dewaxing of petroleum oils, it has been found that after a short period of operation with the usual drum or disc type filters, the filter medium becomes clogged and the filtering rate falls rapidly to a point at which it is necessary to renew the same. This results in considerable loss of time and reduction in the over-all efficiency of the filters.

It is a primary object of the invention to provide a rotary filter including novel supporting means for the filter medium whereby to effect discharge of the filter cake in a novel and efficient manner which will keep the filter medium clean and prevent clogging of the pores thereof.

Another object of the invention is to provide a filter structure in which the filter supporting elements are provided with means providing a plurality of liquid collecting channels or pockets in the supporting surface for the filter medium which channels are formed in such a manner and arranged with respect to wash sprays for the filter cake so as to trap and retain a small quantity of liquid in the channels back of the filter medium as it moves to the "blow" position at which the filter cake is discharged whereby to the trapped liquid is forced outwardly through the filter medium to float the cake off of the filter medium as it approaches the scrapers and to remove all particles of the solid cake forming material from the pores of the filter medium.

Another object of the invention is to provide an improved filter leaf sector for disc type filters having novel means for securing and supporting the filter medium on the surface of the sector so as to protect the filter medium from damage and permit the use of higher blow back pressures in discharging the filter cake from the sector.

Other objects and advantages of the invention will be apparent from the following detailed description and reference to the accompanying drawings illustrating preferred embodiments of the invention. In the drawings:

Fig. 1 is a diagrammatic view of a leaf filter embodying the invention;

Fig. 2 is a side view of one of the sectors, with the filtering medium partially broken away;

Fig. 3 is a section on the line 3—3 of Fig. 2;

Fig. 4 is a side view of one of the sector frames, with the filter medium and filler plates removed;

Fig. 5 is an end view thereof;

Fig. 6 is a section on the line 6—6 of Fig. 4;
Fig. 7 is a section on the line 7—7 of Fig. 4;
Fig. 8 is a section on the line 8—8 of Fig. 4;
Fig. 9 is a section on the line 9—9 of Fig. 4;
Fig. 10 is a section on the line 10—10 of Fig. 4;
Fig. 11 is a plan view of one of the filler plates for the sector frame;
Fig. 12 is a section on the line 12—12 of Fig. 11;
Fig. 13 is a partial end view from the small end, with a matching plate in dotted lines;
Fig. 14 is an end view from the other end, with a matching plate in dotted lines; and
Fig. 15 is a section on the line 15—15 of Fig. 11, with the matching plate in dotted lines.

Referring first to the form of the invention shown in Figs. 1 to 15, 10 is a rotating disc type filter unit mounted on a shaft 11 within a tank 12 to which the material to be filtered is supplied. The filter unit 10 is made up of a plurality of filter sectors 13 having nozzles 14 connected to a rotating core pipe 15 and held in position by radial rods 16 extending between adjacent sectors and clamping pieces 17 which engage the outer edges of the sectors. The core pipe 15 is partitioned and cooperates with the usual valve mechanism at one end by which the interior of the filter sectors are connected with suction and pressure sources in proper sequence as is usual in this type of filter. Spray pipes 18 and 19 are provided for supplying wash liquid to the cake formed on the filter sectors before they reach the cake discharge position and scraper blades 19' are preferably provided for aiding in the discharge of the filter cake at the blow position.

The construction of each of the sectors 13 is the same so that a specific description of one will suffice for all.

The sector 13 comprises a peripheral frame having radial sides 20 extending from the nozzle 14 and a circumferential end 21 connecting the outer ends of the sides to close the frame. The frame is preferably cast in one piece with the nozzle 14 and is preferably formed of light metal such as aluminum. The inner face of the rails 20 are formed with an inwardly projecting rib or shoulder 22 for seating opposite edges of sector shaped filler plates 23 which form the main supporting surface for the filter medium 24 on opposite sides of the sector.

The filler plates 23 preferably are light metal castings placed back to back in the frame with the radial edges engaging opposite sides of the ribs 22 and secured together by screws or bolts such as cap screws 25 extending through one plate and threaded into the other. The backs of the plates 23 are formed with a plurality of spaced matching pads or studs 26 which contact to support the intermediate surface area while leaving ample drainage space between the plates.

The outer surface of the plates 23 are formed with a plurality of spaced radial ribs 27 and a plurality of circumferential or transverse ribs 28 extending from each radial rib. The ribs 28 are spaced apart by webs 29 and preferably terminate short of the next radial rib. The webs 29 are cored to provide elongated radial slots 30 along the back of each of the radial ribs 27 so that the circumferential channels or pockets 31 defined by the ribs 28 and webs 29 open at one end into the drainage grooves or channels 30 and are closed at the opposite end by the radial ribs 27. The ribs 28 all extend in substantially the same direction from the radial ribs 28 toward the trailing edge of the sector on each side and the ends of the ribs 28 at the trailing edge rest on the supporting rib 22 at one side of the frame, providing drainage spaces between them.

At the ends of the sector plates, the ribs 27 are united by integral base and head portions of solid metal and the channels 30 terminate short of these portions so that the sectors have ample strength.

The sector frames are provided on each face with a continuous caulking groove 32 for fastening the edges of the filter cloth 24 through the medium of resilient caulking strips or ropes 33 which are pressed into the grooves to clamp the edges of the filter cloths therein. In order to support the filter cloths against billowing when the sector is blown for removal of the cake, a wire winding 34 is provided over the surface of the same. The turns of wire are held against slipping by engagement in grooves 35 which on one side are slightly angularly disposed to accommodate a spiral winding of the binding wire. The filter supporting surface of the sector plates, provided by the ribs 27 and 28 is formed to present convex surface contour from side to side so that the winding wires exert uniform pressure over the surface from side to side. The ribs 28 are disposed so that they extend at a slight angle to the turns of the winding wires to prevent the latter from entering the channels 31 with resultant undue strain or stretching of the filter cloth.

In operation of the disc filter, the sectors 13 are mounted with the ribs 28 and channels 31 extending from the ribs 27 in the direction opposite to the direction of rotation so that the open or drainage ends of the channels are toward the trailing edge. As each sector travels through the tank 12 and upwardly on the suction cycle, the filtrate drawn into the channels 31 is continuously drained through the slots 30 at the trailing ends thereof. As travel continues, with emergence of the sectors from the mixture in the tank, filtrate extracted from the cake and wash liquid from the sprays 18 is drawn through the cake drained from the channels 31 and discharged. Through this range of operation, the channels 31 slant downwardly toward the drainage openings at the trailing ends thereof and no liquid is retained in them. However as the travel continues past the upper dead center position into the range of the sprays 19, the slant of the channels 31 is reversed, so that even though the sector is still on suction, a portion of the wash liquid will be trapped in the grooves as the sector approaches the blow position where the cake is to be discharged.

When the sector reaches the blow position, gas pressure admitted to the interior thereof forces the trapped liquid in the channels 31 outwardly through the filter cloth and floats the deposited filter cake off of the latter. The removal of the cake is facilitated by the scraper blades 19' which engage the surface of the sector with the edges thereof riding on the winding wires 34.

The forcing of the trapped wash liquid, which may be propane where the filter is used in dewaxing oils, from the grooves 31 outwardly through the filter cloths results in a clean discharge of the filter cake and in effect scavenges the cloth at each discharge so that the filter is self cleaning and clogging of the cloth is prevented thereby permitting the filter to operate at maximum efficiency over long period.

The wire winding of the curved surfaced sectors prevents bulging and stretching of the cloths when blown to discharge the cake, thereby permitting higher discharge pressure and the wire turns also protect the cloth from excessive wear which often results when scraper blades are allowed to make full contact with the unprotected surface of the cloth. However, as the wires are of small gauge and the cloth billows slightly under internal gas pressure there is ample contact between the scrapers and the cloth to insure complete and efficient removal of the filter cake. It should be noted that although the ribbed formation provides ample support for the filter medium over the entire area of the sector, the drainage space and active filter area provided by the channels 31 and slots 30 between the ribs are ample to insure a rapid rate of filtration and the hollow interior of the sector provides for free and uninterrupted drainage of the filtrate to the nozzle 14.

Although preferred embodiments of the invention have been shown and described by way of illustration, it will be understood that various changes in the details of construction and operation may be resorted to without departing from the spirit of the invention within the scope of the appended claims.

I claim:

1. In a rotary disc filter, a sector shaped support for a filter medium mounted for rotation with its major plane normal to the axis of rotation, said sector shaped support having drainage spaces and having its surface formed to provide a plurality of depressed channels extending substantially in the direction of rotation and opening solely at the trailing ends thereof into the drainage spaces.

2. In a rotary disc filter, a sector shaped support for a filter medium mounted for rotation with its major plane normal to the axis of rotation, said sector shaped support having drainage spaces and having its surface formed to provide a plurality of radially spaced depressed channels arranged in circumferentially spaced rows and each extending substantially in the direction of rotation and opening solely at the trailing edge thereof into said drainage spaces.

3. In a rotary disc filter, a sector comprising a marginal frame member defining a truncated sector having a drainage nozzle at the smaller end thereof, a pair of oppositely disposed filler plates secured in said frame member forming a support for a filter medium, said filler plates being formed to provide drainage spaces and having the outer surfaces thereof formed to provide a plurality of ribs and depressed channels extending substantially in the direction of rotation of the filter unit, said channels opening solely at the trailing ends thereof into said drainage spaces whereby to drain liquid passing through the filter medium on the ascent of said sectors and to trap liquid in said channels behind the filter medium on the descent thereof.

4. In a filter disc for a rotary leaf filter having a central drainage shaft, a plurality of individual sectors connected to said shaft each comprising a frame member defining a truncated sector, a pair of oppositely disposed filler plates secured in said frame for supporting a filter medium and defining a drainage space between filler plates, the outer surfaces of said filler plates being formed to provide a plurality of ribs and channels extending substantially in the direction of rotation of the filter disc, said filler plates having drainage openings at the trailing ends of said channels communicating with the drainage space between the plates, said frame having a caulking groove extending around the same for fastening the edges of a filter medium placed over the filler plates and having spaced guide grooves in the sides thereof for seating and positioning the turns of a wire winding for the filter medium.

5. In a filter disc for a rotary leaf filter having a central drainage shaft, a plurality of individual sectors each comprising a frame member defining a truncated sector, a pair of oppositely disposed filler plates secured in said frame for supporting a filter medium and defining a drainage space between said filler plates, the outer surfaces of said filler plates being formed to present a convex outer surface extending between the sides of said frame and to provide a plurality of ribs and channels extending substantially in the direction of rotation of the filter disc, said filler plates having drainage openings at the trailing ends of said channels extending into the drainage space between the plates, said frame having a caulking groove extending around the same for fastening the edges of a filter medium placed over the filler plates and having spaced guide grooves in the sides thereof for seating and positioning the turns of a wire winding for the filter medium.

6. In a sector for a rotary leaf filter, a frame member defining a truncated sector and having inwardly projecting ribs on the inside of the side members thereof, a pair of sector shaped filler plates fitting within said frame and secured together back to back with the side edges engaging opposite sides of said ribs, said plates having convex outer surfaces extending from side to side formed to provide a plurality of ribs and channels extending substantially on lines concentric with the axis of rotation of the filter leaf, said filler plates having contacting protuberances on the back thereof and defining a drainage space between them and having openings therein connecting said drainage space with the trailing ends of said channels.

7. A sector for a rotary leaf filter according to claim 6 in which said frame is a cast unit having an integral drainage nozzle and having a caulking groove extending around the sides and ends thereof for fastening the edges of a filter medium placed over the filler plates.

FREDERICK E. KURZ.